United States Patent [19]

Ecker

[11] 4,240,949

[45] Dec. 23, 1980

[54] POLYMERIC COMPOSITIONS AND PROCESS FOR THEIR PRODUCTION

[75] Inventor: Alfred Ecker, Vienna, Austria

[73] Assignee: OMV Aktiengesellschaft, Vienna, Austria

[21] Appl. No.: 951,588

[22] Filed: Oct. 16, 1978

[30] Foreign Application Priority Data

Oct. 21, 1977 [AT] Austria ................................ 7549/77

[51] Int. Cl.$^3$ ................................................ C08K 5/36
[52] U.S. Cl. ........................ 260/30.8 R; 260/33.6 PQ; 260/42.24
[58] Field of Search .......... 260/42.24, 30.8 R, 33.6 PQ

[56] References Cited

U.S. PATENT DOCUMENTS

| 3,251,797 | 5/1966 | DePugh et al. ................. 260/42.24 |
| 3,290,266 | 12/1966 | Barnes et al. .................. 260/42.24 |
| 3,299,568 | 1/1967 | Tobolsky et al. .............. 260/30.8 R |
| 3,450,667 | 6/1969 | Kopacki ........................... 260/42.24 |
| 3,542,701 | 11/1970 | van Raamsdonk ............. 260/42.24 |
| 3,634,293 | 1/1972 | Bonitz ............................. 260/42.24 |
| 3,676,166 | 7/1972 | Louthan .......................... 260/42.24 |
| 4,079,023 | 3/1978 | Woo ................................ 260/42.24 |

*Primary Examiner*—Lewis T. Jacobs

[57] ABSTRACT

Disclosed is an olefinic, polymeric composition and a method for making such polymeric composition wherein the composition includes 10%–90% modified sulfur. The sulfur is modified by the addition of at least one plasticizer and a thiophilic, nitrogen-containing compound as a viscosity regulator. In accordance with the invention, elemental sulfur is modified by the addition of any of several plasticizers in amounts of about 1%–20% by weight based on sulfur and the addition of up to about 5% by weight of a thiophilic, nitrogen-containing compound such as any of various amines or amides.

14 Claims, No Drawings

POLYMERIC COMPOSITIONS AND PROCESS FOR THEIR PRODUCTION

The present invention relates to polymeric compositions, in particular dispersions, of sulfur and polymers, in particular polyolefins, preferably polyethylene and polypropylene, obtained by radical polymerization or additive reaction.

It is known to incorporate sulfur in small percentages into polymers, as this improves the strength properties of the polymers and allows extending (filling) expensive plastic materials by inexpensive sulfur.

U.S. Pat. No. 3,450,667 describes a polymeric product extended (filled) with 10 to 45 percent by weight of sulfur. In producing the polymeric composition, elementary sulfur and solid polymer are heated to about 190° to 218° C. until the sulfur is present in amorphous, polymeric form.

According to Japanese patent specification No. 7390342, sulfur is mixed with polypropylene, the sulfur concentration amounting to a maximum 30%. At concentrations in excess of this, the sulfur effloresces. For this reason, U.S. Pat. No. 3,450,667 describes the processing of polymers consisting of α-olefins with sulfur at temperatures >190° C. in devices conventional for the plastics processing industries, such as extruders, mills, kneaders, whereby the polymeric sulfur obtained at these high temperatures can be mixed with the polymers in high concentrations without separation.

It was surprisingly found that polymers can be extended (filled) with larger amounts of sulfur without efflorescences if the sulfur added to the polymer had previously been treated with plasticizers.

The polymeric compositions according to the invention are thus characterized in that they contain 10 to 90 percent by weight, preferably 20 to 60 percent by weight, of sulfur modified by the addition of plasticizers optionally containing at least one viscosity regulator.

Suitable polymeric components are particularly polyolefins, preferably polyethylene or polypropylene, but also polymers obtained by polymeric addition such as epoxy and polyurethane products.

Suitable plasticizers are olefinic hydrocarbons such as dicyclopentadiene, styrene, cyclooctadiene, cyclododecatriene, dipentene, vinyl cyclohexane or inorganic sulfides such as arsenic sulfides and phosphor sulfides.

The plasticizers are preferably present in the polymeric composition in amounts of 1 to 20 percent by weight based on sulfur.

In addition to the plasticizer, a viscosity regulator, optionally in the form of a thiophilic, nitrogen-containing compound, can be added to the sulfur. Thiophilic, nitrogen-containing compounds are, a.o., amines, diamines, alkanol amines and amides, e.g. primary, secondary and tertiary amines such as butylamine, dibutylamine or tributylamine; aliphatic straight-chained, branched or cyclic amines such as n-butylamine, isononylamine and cyclohexylamine; tetramethyl ethylene diamine, diethanol amine; aromatic amines such as aniline and naphthylamine, fatty acid amides and ureas; and heterocyclic amines such as piperidine and benzothiazoles.

By means of these viscosity regulators, the viscosity of the sulfur can be regulated and the degree of polymerization of the sulfur thus brought to an optimum.

The addition of sulfur in polymeric form permits maintaining the dispersion up to setting of the product, which allows the production of a polymeric product of high sulfur content without separation.

The thiophilic, nitrogen-containing compound is preferably used in amounts of up to 5 percent by weight based on sulfur.

In addition to the plasticizers, the sulfur can contain fillers, dispersing agents, emulsifiers, colorants and/or the inhibibors conventionally used in the processing of plastic materials.

The invention further relates to a process for the production of the polymeric compositions which is characterized in that the sulfur is treated, prior to admixture to the polymeric compound, with plasticizers optionally containing viscosity regulators.

The advantage over known processes achieved according to the invention resides in the fact that it is not necessary to first produce polymeric sulfur by exposure to high temperatures, but instead the polymeric sulfur is obtained by means of the plasticizers mentioned and then incorporated into the polymers.

The polymeric compositions can be produced by mixing of the components at temperatures of 120° to 200° C. and dispersing, kneading, extruding or the like.

The dispersions can be produced by dispersing the sulfur in the polymeric substance or vice versa.

The products according to the invention are used in the plastics industry for conventional purposes or as coating materials.

The polymers extended (filled) with sulfur show improved physical properties such as better impact strength, tensile strength and elongation at break as compared to the pure polymeric product.

The products are also economically significant, since expensive plastic materials can be partially replaced by inexpensive sulfur.

The invention is explained in detail by means of the following examples:

EXAMPLE 1

Into 1200 g of the liquid sulfur, 72 g dicyclopentadiene are poured under the surface and 1.2 g dibutyl amine are added at 140° C. and under stirring. After 4 hours mixing time, the modified sulfur is added to 2100 g atactic polypropylene melted at 170° C. and mixed in a Hobart mixer with kneading hook for 15 minutes. The result is a homogenous, elastic product which is poured into a glass mold sprayed with mold release.

EXAMPLE 2

500 g sulfur modified by means of 5 percent by weight of dicylcopentadiene are pulverized, premixed with 500 g granules of isotactic polypropylene died black and then filled through a hopper into an injection molding machine with screw conveyor. The temperature of the cylinder is 180° C. in zones 1 and 2 and 150° C. in zone 3. After 15 seconds, a molded article of metallic color and high strength can be taken from the mold.

EXAMPLE 3

A three-necked flask provided with agitator and reflux cooler is charged with 450 g sulfur and 50 g cyclopentadiene, the reaction is continued for 4 hours at 140° C. The modified sulfur is then transferred to a beaker preheated to 150° C. Then, 48 g atactic polypropylene in small pieces are added and dispersion is carried on for 5 minutes by means of a high-speed mixer (Ultraturrax). Then, 137 g filler (trade name Plastorit Naintsch) of a particle size of 20μ was stirred in and the mixture is poured onto a concrete surface. After one hour, the coating shows good adhesion to concrete and high strength.

What is claimed is:

1. Polymeric compositions of olefinic polymers obtained by radical polymerization or additive reaction, characterized in that they contain 10 to 90 percent by weight of sulfur modified by means of at least one plasticizer and a thiophilic, nitrogen-containing compound as a viscosity regulator.

2. Compositions according to claim 1, wherein the polymer is dispersed in said modified sulfur as a carrier.

3. Compositions according to claim 1, wherein the polyolefin employed is polyethylene or polypropylene.

4. Compositions according to claim 1, characterized in that they contain 20 to 60 percent by weight of modified sulfur.

5. Compositions according to claim 1, wherein the plassticizer is employed in an amount of 1 to 20 percent by weight based on sulfur.

6. Compositions according to claim 5, wherein the plasticizer employed is an olefinic hydrocarbon.

7. Polymeric compositions according to claim 1, wherein the plasticizer employed is an inorganic sulfide.

8. Composition according to claim 1, wherein the modified sulfur employed contains fillers, dispersing agents, emulsifiers, colorants, talc and/or inhibitors.

9. Polymeric compositions in the form of dispersions, of olefinic polymers obtained by radical polymerization or additive reaction in 10 to 90 percent by weight of sulfur which has been modified by means of plasticizers containing at least one thiophilic, nitrogen-containing viscosity regulator.

10. Compositions according to claim 9, wherein the olefinic polymer employed is polyethylene or polypropylene.

11. Compositions according to claim 9, characterized in that they contain 20 to 60 percent by weight of modified sulfur.

12. Compositions according to claim 9, wherein the thiophilic, nitrogen-containing compound employed is selected from the group consisting of amines, diamines, alkanolamines and amides.

13. Compositions according to claim 12, wherein the thiophilic, nitrogen-containing compound employed is present in amounts of up to 5 percent by weight based on sulfur.

14. A process for the production of a polymeric composition comprising the steps of: treating sulfur with at least one plasticizer and at least one thiophilic, nitrogen-containing viscosity regulator to produce a modified sulfur and dispersing an olefinic polymer in the modified sulfur.

* * * * *